Figure 3:
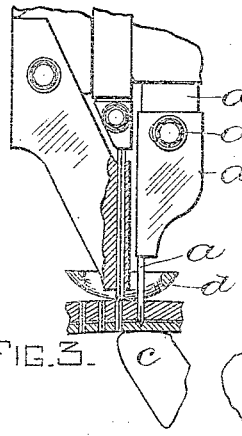

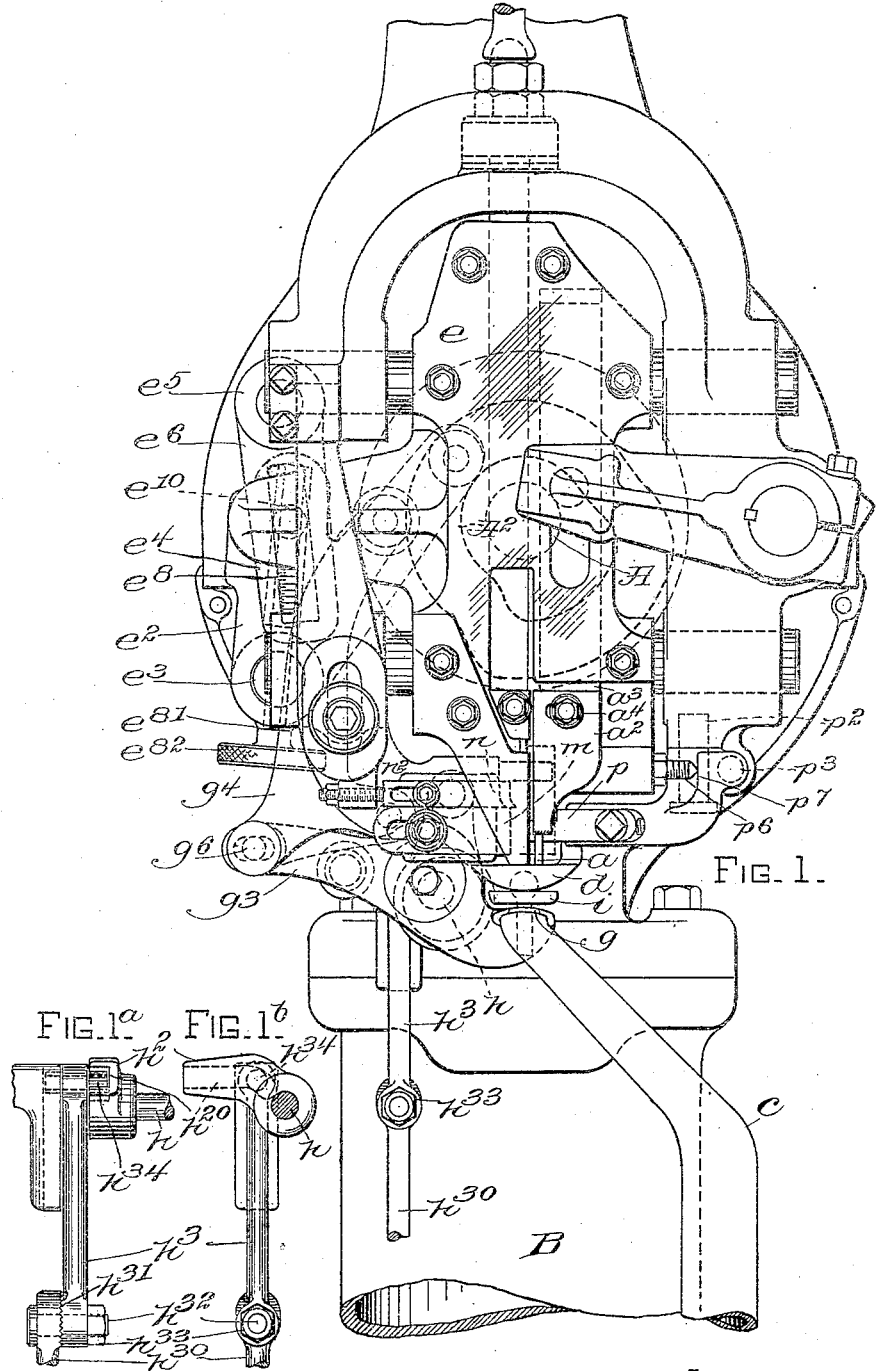

J. F. DAVEY.
PEGGING MACHINE.
APPLICATION FILED APR. 30, 1903.

931,042.

Patented Aug. 17, 1909.
10 SHEETS—SHEET 2.

WITNESSES.
Jas. J. Maloney
Nancy P. Ford

INVENTOR.
John F. Davey
by Roberts & Livermore
Attys.

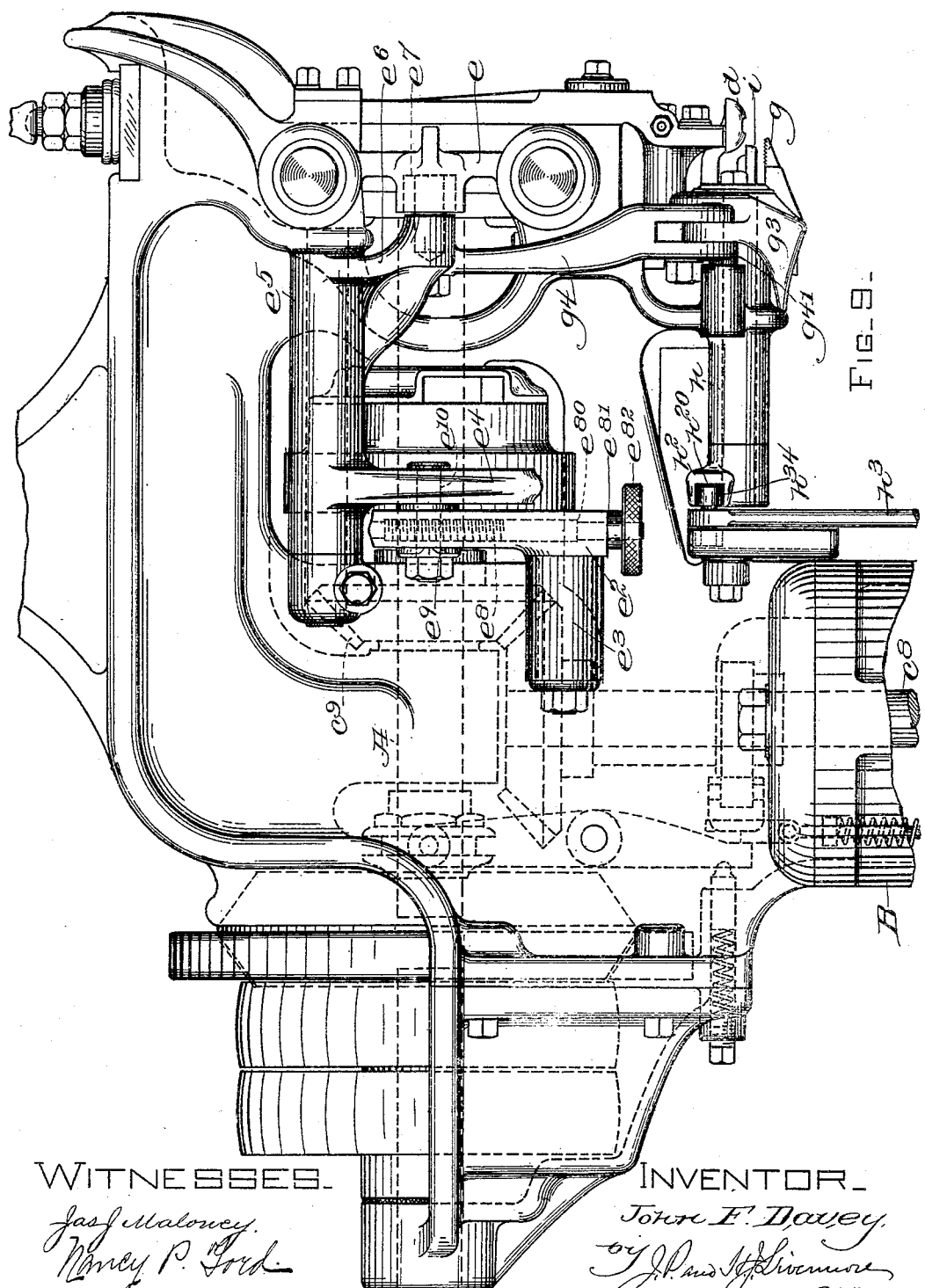

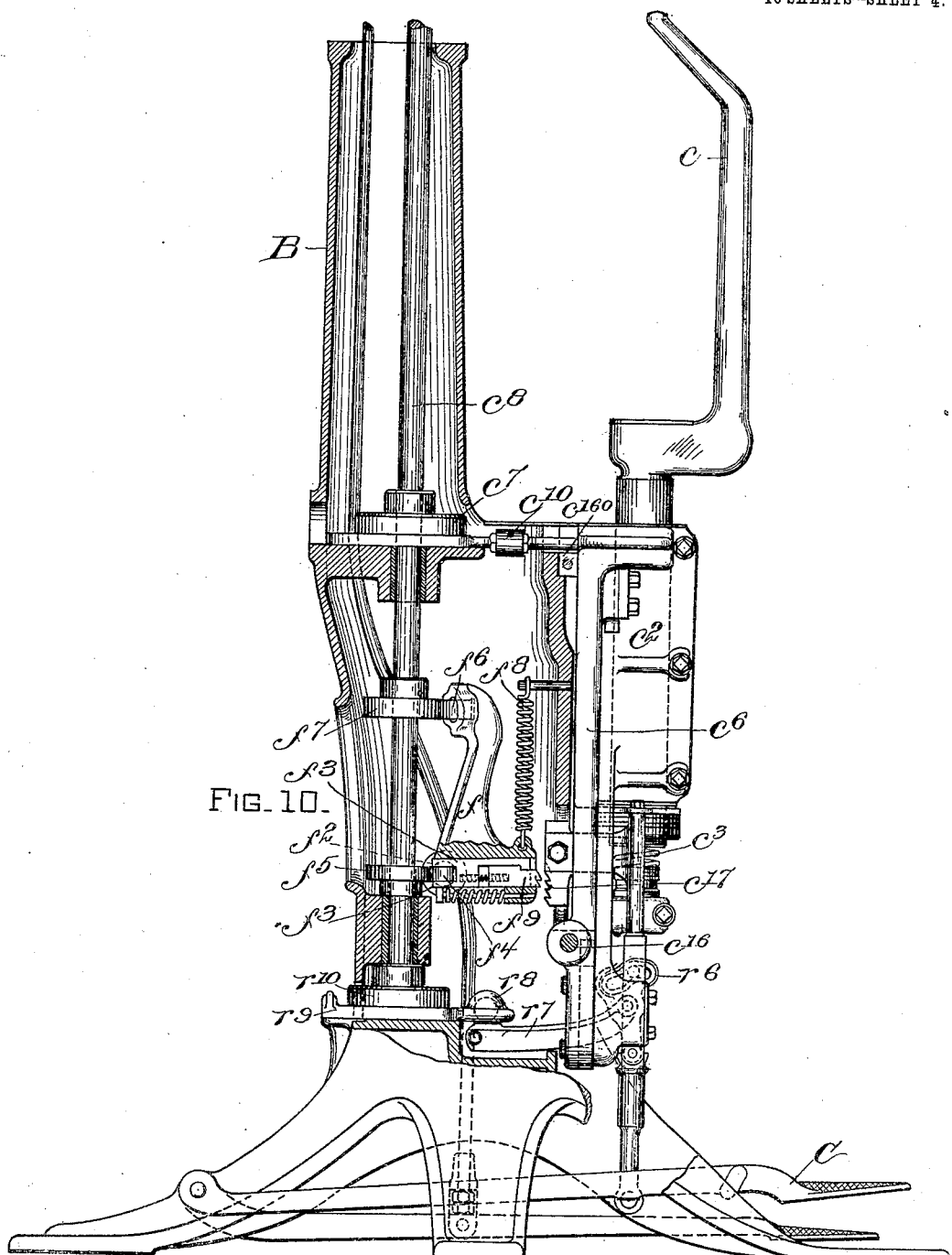

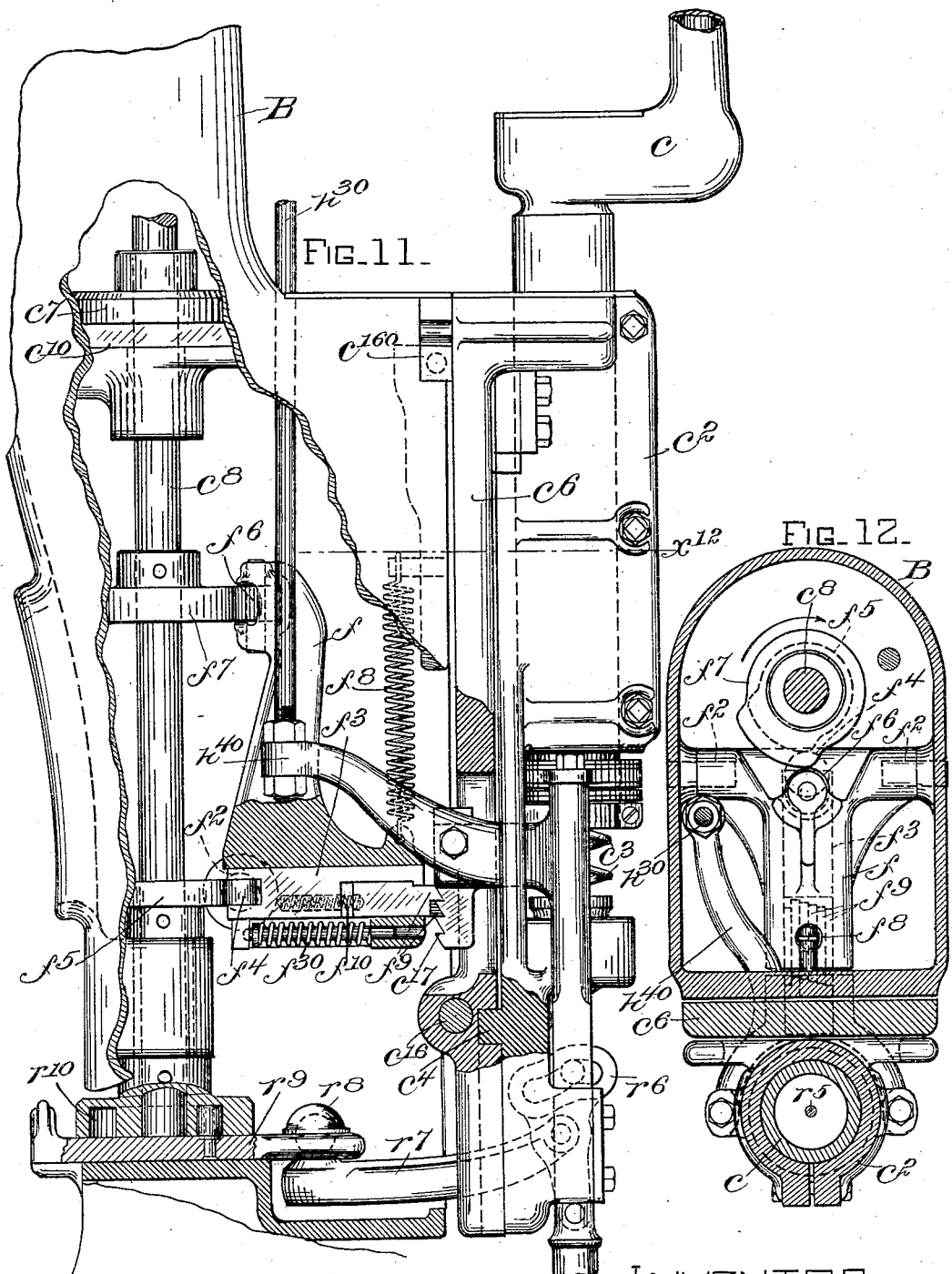

J. F. DAVEY.
PEGGING MACHINE.
APPLICATION FILED APR. 30, 1903.
931,042.
Patented Aug. 17, 1909.
10 SHEETS—SHEET 6.
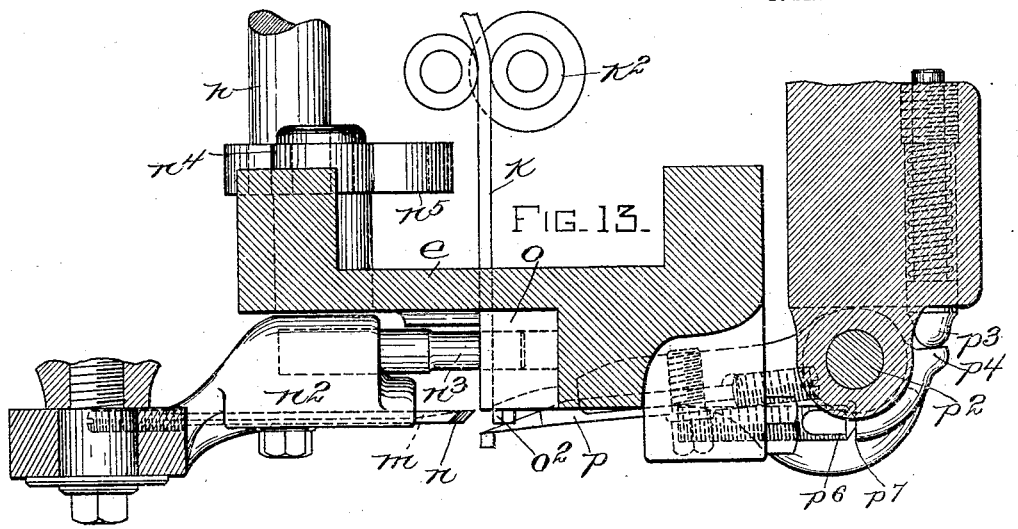
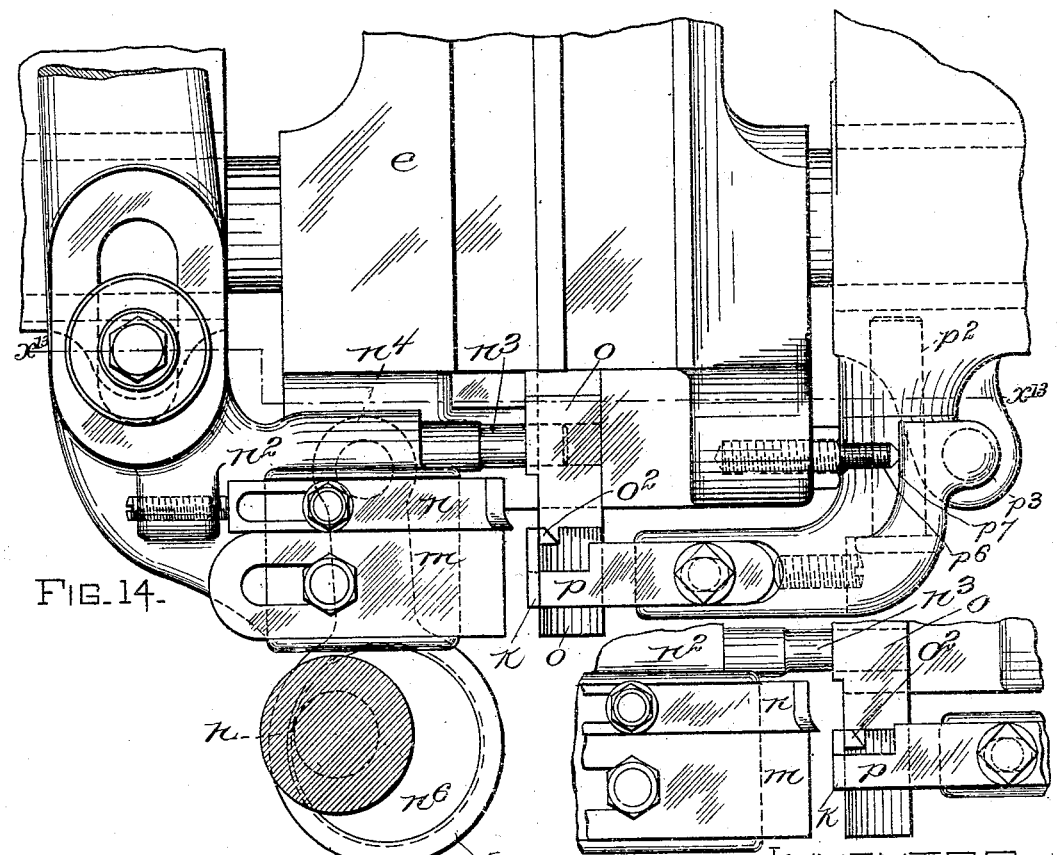

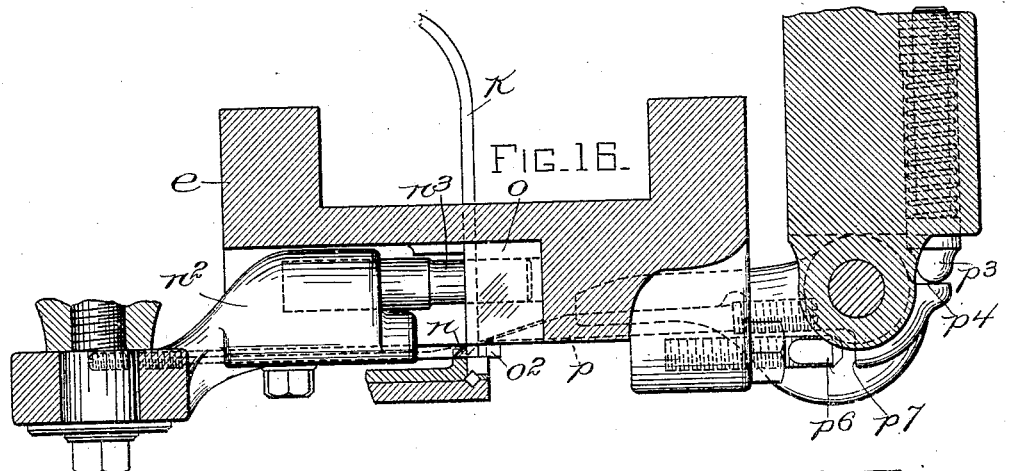
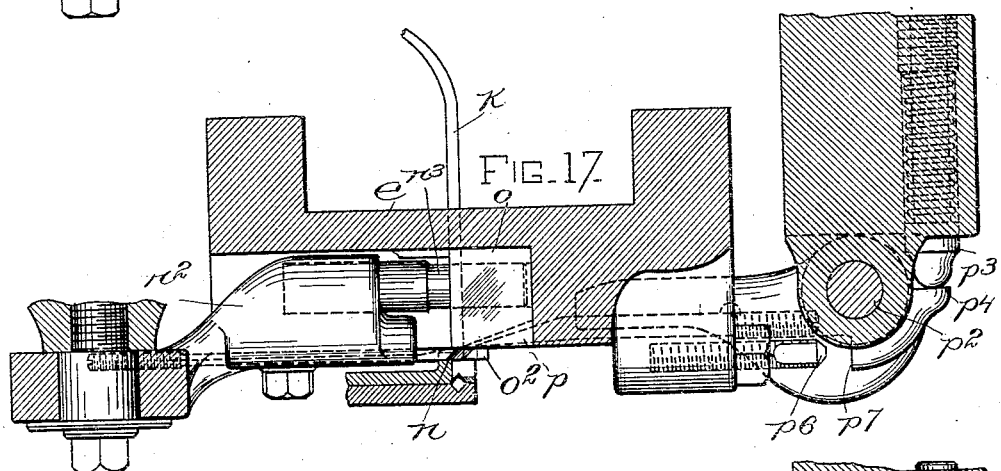
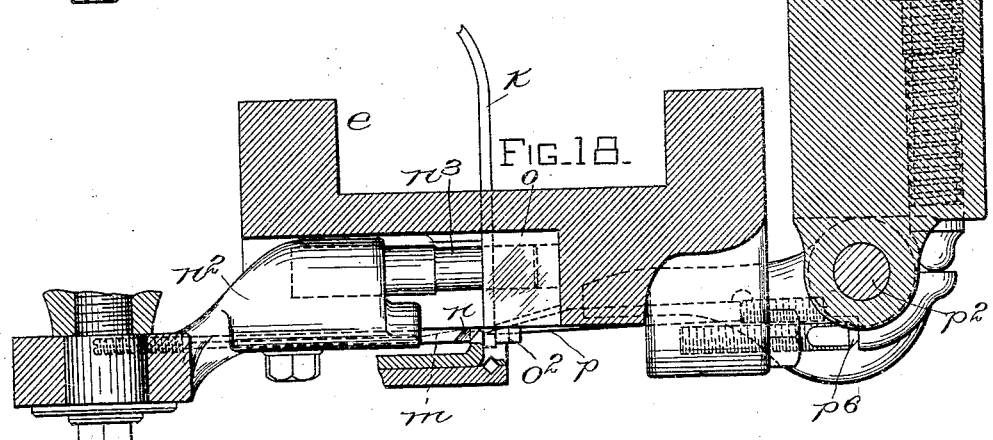

J. F. DAVEY.
PEGGING MACHINE.
APPLICATION FILED APR. 30, 1903.
931,042.
Patented Aug. 17, 1909.
10 SHEETS—SHEET 8.
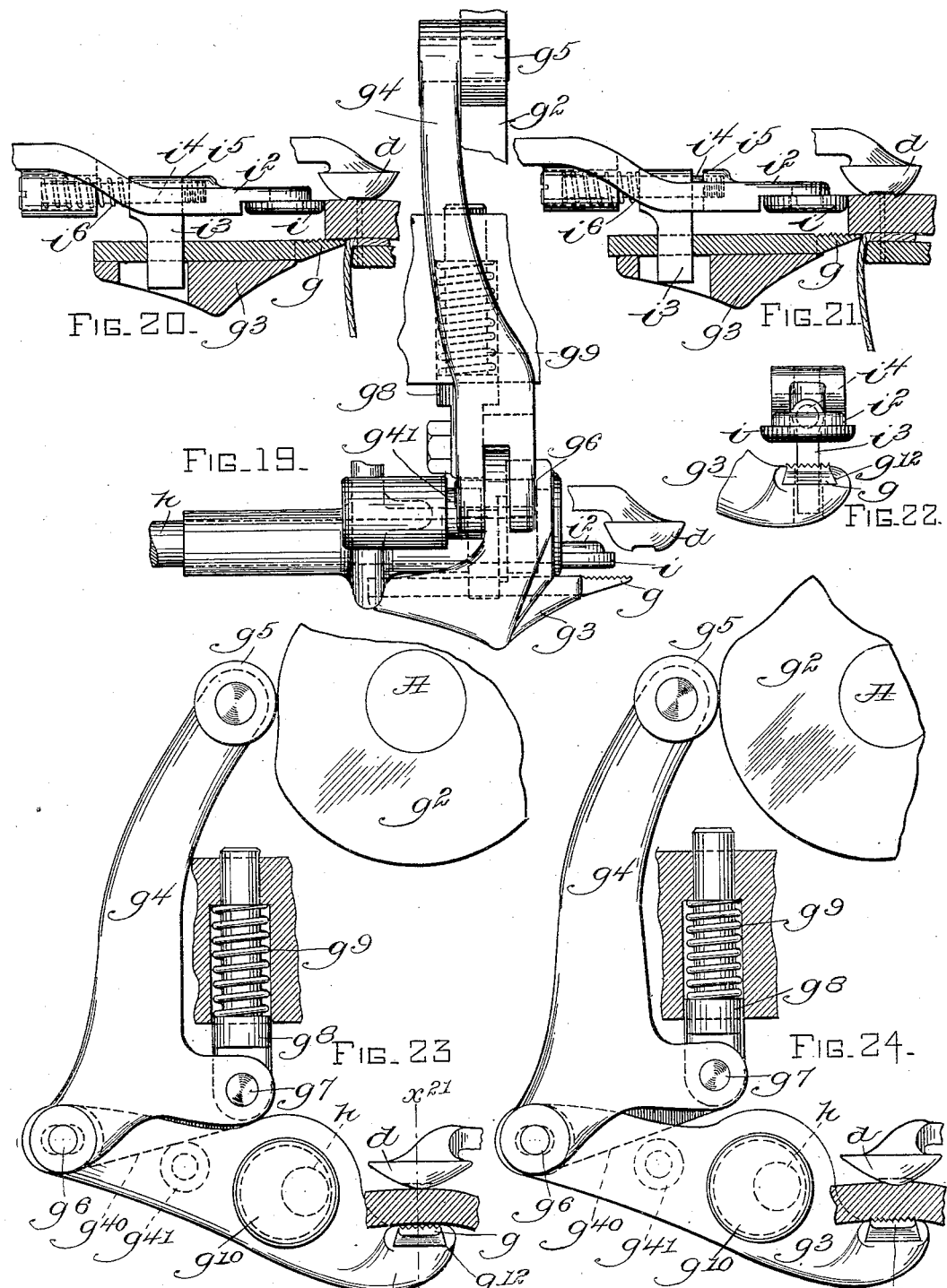

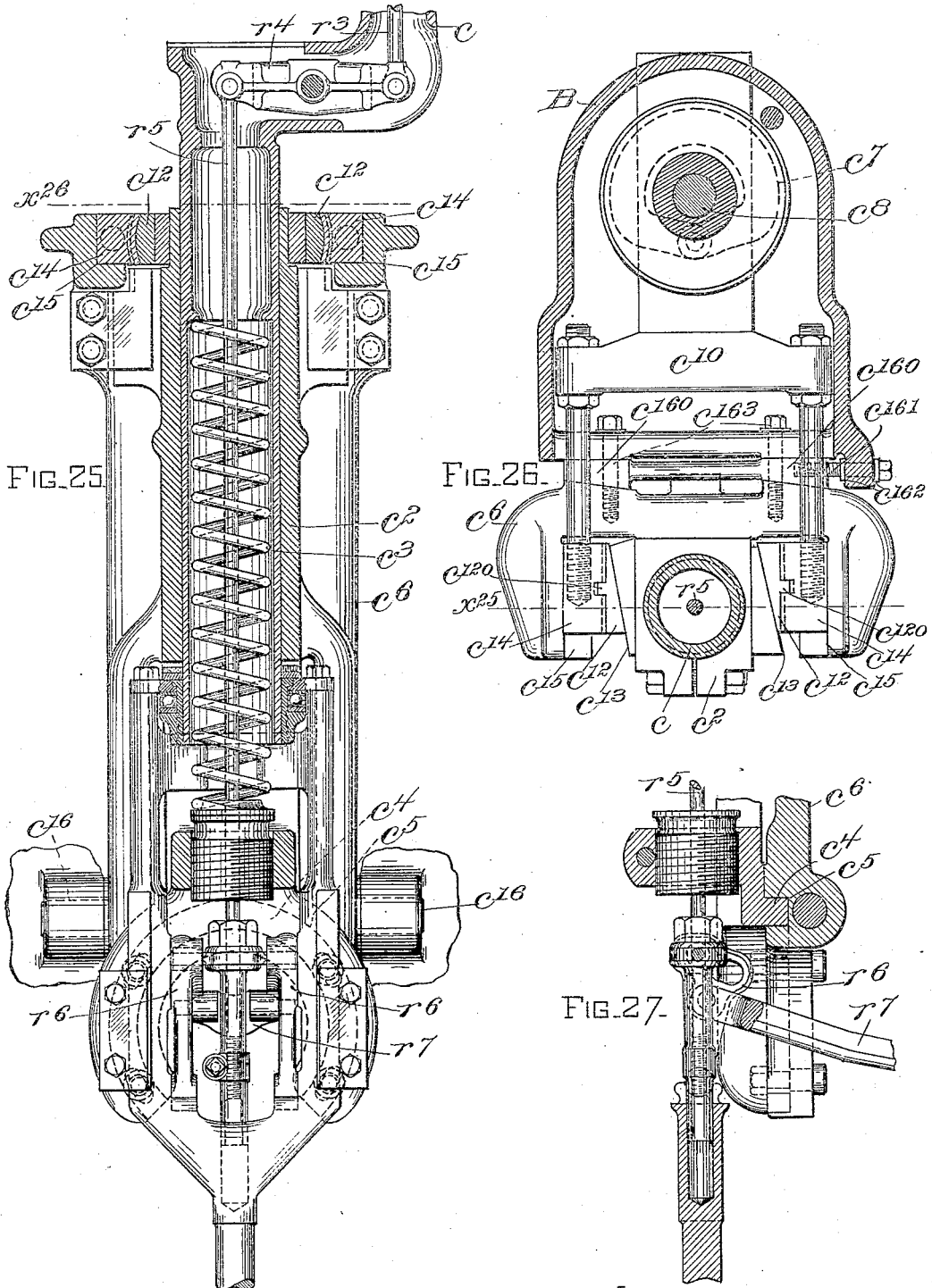

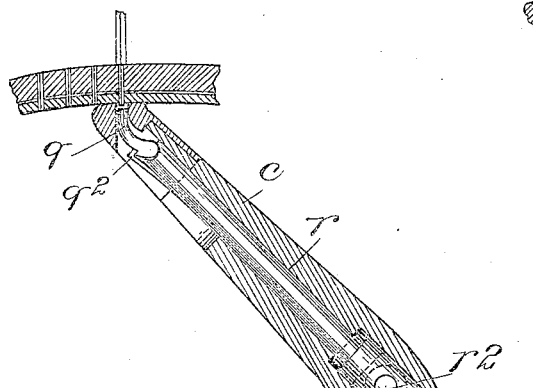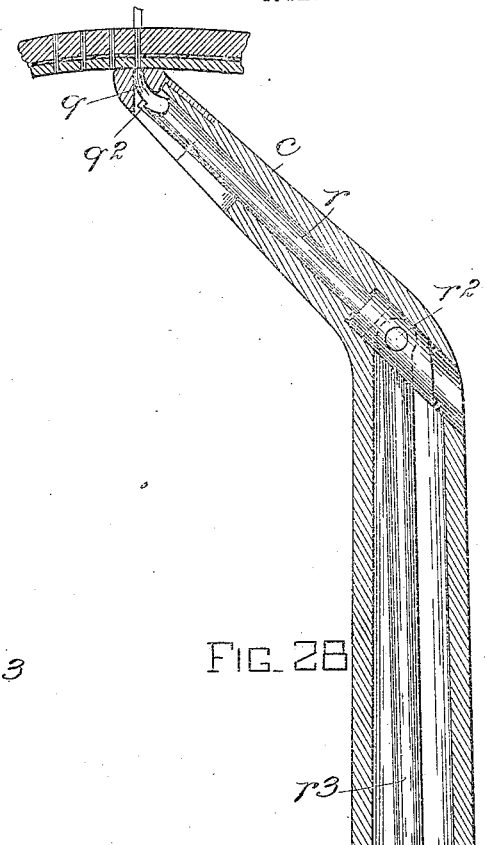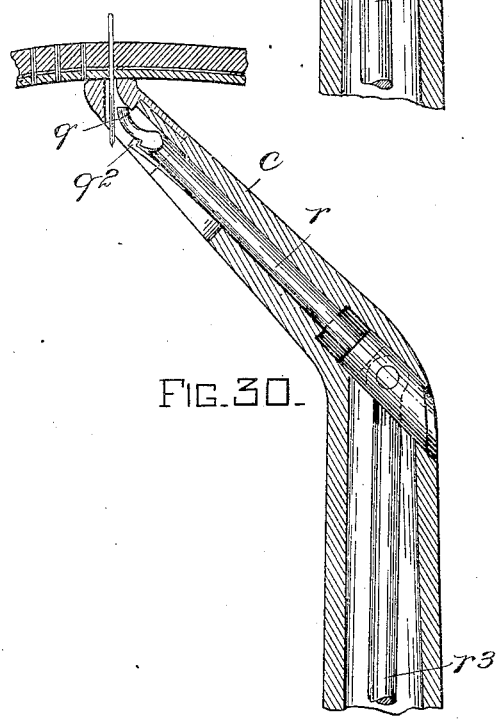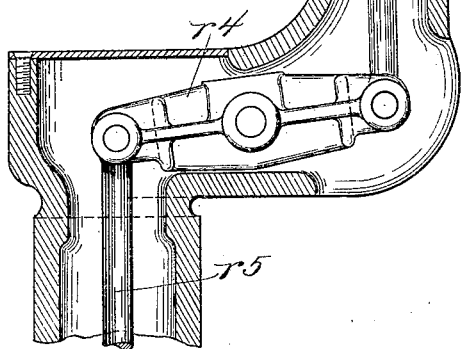

UNITED STATES PATENT OFFICE.

JOHN F. DAVEY, OF BEVERLY, MASSACHUSETTS, ASSIGNOR TO UNITED SHOE MACHINERY COMPANY, OF PATERSON, NEW JERSEY, A CORPORATION OF NEW JERSEY.

PEGGING-MACHINE.

No. 931,042.  Specification of Letters Patent.  Patented Aug. 17, 1909.

Application filed April 30, 1903. Serial No. 155,047.

*To all whom it may concern:*

Be it known that I, JOHN F. DAVEY, of Beverly, county of Suffolk, and State of Massachusetts, have invented an Improvement in Pegging-Machines, of which the following description, in connection with the accompanying drawings, is a specification, like letters on the drawings representing like parts.

The present invention relates to a machine for pegging boots and shoes, and is embodied in certain novel features of construction and arrangement which will be hereinafter fully described.

The machine embodying the invention is provided with means for adjusting the length of feed to vary the distance between the pegs, and the feed itself is accomplished by novel means including a laterally movable horn or work support and a gripper for the material, the horn traveling with the laterally movable awl after the latter has penetrated the material, while the gripper holds the material during the return movement of the horn which takes place prior to the next complete operation of the awl. By this construction the awl is capable of fully penetrating the material prior to the feed movement and the material thus penetrated is clamped between the shoulder on the awl carrier and the surface of the horn so that the lateral strain upon the awl when the latter is depended upon wholly to feed the material is obviated. The gripper which acts to hold the material during the return movement of the horn is so arranged as to adjust itself automatically to materials of different thicknesses, the gripper members being controlled in their gripping movement by mechanism which depends for its operation upon the position of the horn, such position of course depending upon the thickness of the material which is pressed by the horn against the nose-piece at the head of the machine, the horn being depressible against a yielding force so as to bear against the under side of the material regardless of the thickness thereof.

In conjunction with the laterally movable horn and the gripper which holds the material, the machine is provided with a releasing device which is adapted to operate during the return movement of the horn to force the same down against the stress of its spring, so that it will be out of contact with the material in its return movement and will travel freely without rubbing contact, the material at this period being held by the gripper.

A further feature of the invention consists in peg cutting mechanism of novel construction, whereby each peg is cut from the pegwood to the proper length prior to its being driven, the length of the peg depending upon the thickness of the material. For this purpose the peg cutting mechanism has two knives or cutters, one of which may be termed for convenience the measuring knife, and the other the severing knife, the former cutting horizontally along the top of the peg wood strip to determine the length of the peg, and the latter cutting vertically to sever the previously measured peg from the strip. The measuring knife is vertically movable and its vertical movement depends upon the vertical movement of the horn during the operation of the machine, which vertical movement in turn depends upon variations in the thickness of the material. The operation is such that when the horn is depressed to a greater extent because the material is thicker, the measuring knife will be correspondingly raised so as not to cut so much from the top of the peg-wood strip, the result being that a longer peg is produced. Similarly, of course, when the material is thinner, a correspondingly shorter peg will be cut off. Each peg is cut just prior to the driving operation, so that every peg is measured for length according to the thickness of the material when in position to receive the peg, thus insuring that each peg will be of the right length. In conjunction with this feature of the invention, the machine is provided with a peg feeding device which carries the severed peg under the driver, the next feed movement of the peg-wood strip not being depended upon to feed the severed peg, since this would result in the measuring of each peg to correspond to the thickness of the sole at the preceding driving operation. The knives which cut the pegs are stationary during the cutting movement, and the cutting is accomplished by the laterally movable head which carries the awl and driver, the said laterally movable head forcing the peg-wood against the knives or blades, the measuring blade having been previously vertically positioned to correspond with the position of the horn, which depends upon the thickness of the material, as stated. The measuring knife has its blade so shaped as to sever the peg-wood not only horizontally but also vertically, in order to cut away the waste material from the top of the peg-wood strip, and furthermore projects beyond the severing knife, so that the peg is measured, i. e. cut horizontally to the right length, before it has been severed from the strip. To facilitate the cutting operation, the carrier for the awl and driver which presses the peg-wood against the knives is provided with a projection which engages the peg-wood, the surface of said projection acting as a shearing surface in conjunction with the measuring blade. This shearing surface is also arranged to be vertically moved to correspond with the vertical movement of the horn, so that it will always be in the proper position with relation to the blade.

The machine is provided with an edge gage to position the stock with relation to the awl and peg driver mechanism, and the said gage may be arranged to be moved into two or more positions for the purpose of differently positioning the material for driving two or more rows of pegs at different distances from the edge of the sole. As has been previously stated, the material is held during the rearward movement of the horn by means of a gripper member, the said gripper member acting upon the top and bottom of the sole where it projects beyond the upper. When the gage is differently positioned, therefore, it is necessary that the said gripper member should be differently positioned to correspond, and for this purpose the said member is arranged to be moved toward and from the shoe with the gage. It is desirable, however, that the gripper member should project as far as possible toward the upper in order to get a firm grip on the sole. For this reason the said gripper member is arranged to be positively moved away from the sole when the gage is moved correspondingly, there being, however, a yielding connection between the said gripper member and the gage to permit a movement of the gripper member with relation to the gage in the opposite direction if the side of the shoe upper projects nearer the edge of the sole in one place than in another, so that the gripper member cannot project so far over the sole. This construction whereby the gripper is yieldingly pressed toward the material is also of advantage with a non-adjustable gage.

To provide for the lateral movement of the horn in the feeding of the material without interfering with the usual construction and arrangement whereby the horn is made rotatable and depressible, the support for the said horn is pivotally mounted near its lower end, the radius of pivotal movement being so long and the movement so slight that the horn top or cover which supports the work will remain in proper contact with the work. To provide for the lateral movement of the horn in unison with the movements of the other parts of the machine, the frame or post of the machine may be provided with a vertical shaft extending downward from the main shaft and driven thereby, the said vertical shaft having cams or equivalent operating devices to provide for the movement aforesaid. When such shaft is used, however, it renders it desirable to keep the head of the machine stationary instead of having it adjustable, and in order to adjust the relation between the head and the horn for any reason, for example, if awls or drivers of different sizes are to be used, a portion of the horn support may be mounted on trunnions, so that the horn may be swung in a direction transverse to its direction of lateral feed movement for purposes of adjustment. As herein shown, both the adjusting movement of the horn and the actual working movement thereof in connection with the feed are provided for by means of wedges, the adjusting wedge being provided with a screw to lock it after the adjustment has been made, and the other wedges being connected with a movable part of the machine so as to move back and forth and produce the lateral movement of the horn while the machine is in operation.

A further feature of the invention is embodied in means for clenching the end of the driven peg within the shoe, the means, above described, for determining the length of each peg rendering it unnecessary to trim the pegs, which will not project through the material to any undesirable extent.

Figure 1 is a front elevation of the upper or head portion of a machine embodying the invention; Figs. 1$^a$ and 1$^b$ are details showing the means for transmitting the vertical movement of the horn to the gripper and measuring knife; Figs. 2, 3, 4, 5, 6, 7 and 8 are details showing the awl, horn and driver in different positions for the purpose of clearly illustrating the operation of the machine; Fig. 9 is a side elevation of the upper portion or head of the machine; Fig. 10 is a vertical section partly in elevation of the lower portion of the machine; Fig. 11 a similar view on a larger scale to illustrate more clearly the construction and operation of the horn releasing device; Fig. 12 a horizontal section on the line $x^{12}$ of Fig. 11; Fig. 13 a horizontal section on a larger scale illustrating the peg feeding device, the section being taken on line $x^{13}$ of Fig. 14; Fig. 14 a partial front elevation illustrating the peg cutting mechanism; Fig. 15 a detail similar to Fig. 14 showing a different adjustment of the measuring knife; Figs. 16, 17 and 18 horizontal sectional details similar to Fig. 13, to illustrate the operation of cutting and feeding the pegs; Figs. 19, 20, 21, 22, 23 and 24 details illustrating the construction and mode of operation of the gripper which holds the material between feed movements, Figs. 20 and 21 being sections on line $x^{21}$ of Fig. 23; Fig. 25 a vertical section of the lower portion of the horn support taken on the line $x^{25}$ of Fig. 26; Fig. 26 a horizontal section on the line $x^{26}$ of Fig. 25 showing the means for producing the lateral movement of the horn; Fig. 27 a transverse vertical section of the part shown in the lower portion of Fig. 25; and Figs. 28, 29 and 30 details showing the construction and operation of the peg upsetting or clenching device.

The invention is shown as applied to a machine of the type described in Letters Patent of the United States No. 581,066, Davey and Ladd, dated April 20, 1897, and the means for producing the reciprocating movements of the awl and driver, as well as the means for depressing the horn are herein shown as substantially the same as those described in the above named patent and consequently will not be described in detail herein, except as may be necessary to give a clear understanding of the novel features of the present invention.

Figure 4:
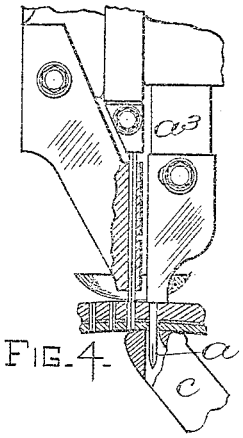
Figure 5:
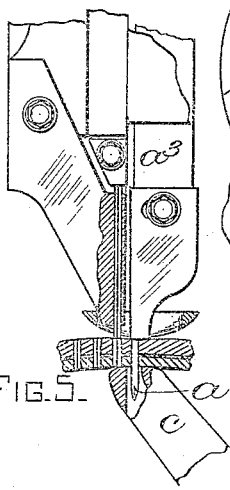
Figure 2:
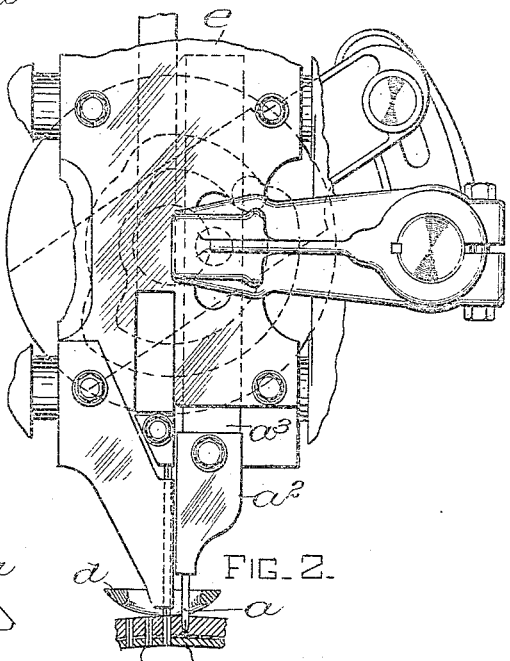
Figure 6:
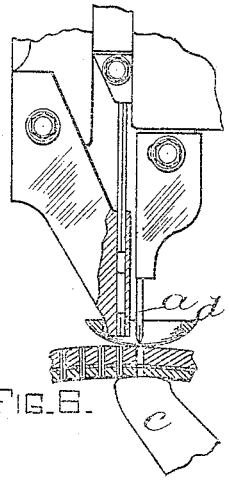
Figure 7:
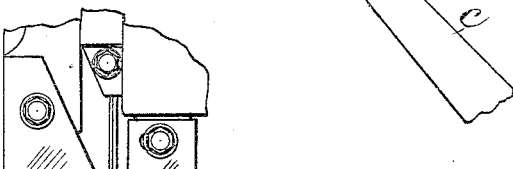
Figure 8:
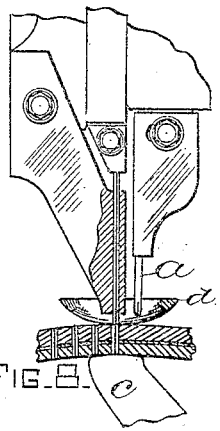

To afford a better understanding of the invention the operation of the machine may be described as follows, having reference mainly to Figs. 1 to 8. In Fig. 1 the parts are shown as in their normal position, the awl $a$ being raised so as to permit the insertion of the material, the horn $c$ being depressible by means of a treadle C, (Fig. 10) so that the material can be inserted between it and the nose plate $d$, through which the awl and driver operate, as illustrated in Fig. 2. When the machine is started, the awl $a$ descends, partially perforating the material, as illustrated in Fig. 2; and before the awl has completed its downward movement the horn $c$ moves back to the position shown in Fig. 3, so that the opening in the said horn is in line with the awl, as illustrated in Fig. 4, thus permitting the awl to penetrate the material wholly and make a hole through the same for the peg. The carrier for the awl and driver then moves laterally, the horn participating in the movement, feeding the material forward to the position shown in Fig. 5, at which period in the operation the peg is cut. The awl $a$ then rises, as shown in Fig. 6, and the carrier for the awl and driver moves back to the position shown in Fig. 7, the peg being fed during this return movement of the carrier, while the horn remains stationary. In the meanwhile, the driver has been raised to permit the feed of the peg, and dropped to drive the same, as shown in Fig. 8. The awl then begins its downward movement and the horn moves back as previously described, to permit the awl to complete its movement and penetrate the material, and the cycle of operations is completed. While the horn is moving back the material is held by the gripper, which releases, however, prior to the movement of the horn and carrier which feeds the material.

The awl and driver, which are provided with reciprocating devices substantially like those shown in the prior patent above referred to, are mounted in a laterally movable carrier $e$, the lateral movement thereof being accomplished through the agency of an arm or elbow lever $e^2$ pivoted at $e^3$ and adapted to be operated by a cam $A^2$ upon the main shaft A of the machine, (dotted lines, Fig. 1), the said lever having an adjustable connection with an arm $e^4$ which extends radially from a sleeve $e^5$ which has a suitable pivotal bearing and is provided with another radial arm $e^6$ which engages in a recess $e^7$ (Fig. 9) formed in a part of the carriage $e$. The adjusting connection between the arms $e^2$ and $e^4$ as best shown in Fig. 9, is provided for by means of a stem $e^8$ (dotted lines, Fig. 9) which is screw threaded in a sliding stud $e^9$, said stud having a projection $e^{10}$ which enters a slot in the arm $e^4$, it being obvious, therefore, that by moving the said stud longitudinally with relation to the arm $e^4$ the amount of oscillation of the sleeve $e^5$ and consequent lateral movement of the carriage $e$ can be adjusted. The threaded stem $e^8$ is rotatably mounted in the arm or lever $e^2$ and is prevented from longitudinal movement therein by means of shoulders $e^{80}$ and $e^{81}$, so that the longitudinal movement of the stud $e^9$ is produced by turning the stem $e^8$, which is provided for the purpose with a nut or finger-piece $e^{82}$. This construction affords means for easily varying the feed movement of the machine; that is to say, the distance between adjacent pegs, to adapt the machine for work of different kinds. The adjustment of the feed movement provided for as above described, necessitates a corresponding adjustment of the awl with relation to the peg driver, since the said awl and driver move in common with the carriage, and must, therefore, be laterally separated a distance equal to the length of feed movement. As herein shown, this adjustment is provided for by forming a transversely extending slot in the awl carrier $a^2$, as shown in dotted lines, and clamping said awl carrier to the awl bar $a^3$ when in its adjusted position by means of a clamping bolt $a^4$.

In order to produce the lateral movement of the horn, above described, without interfering with the horn depressing mechanism, the horn support may advantageously be mounted pivotally near its lower end and oscillated by suitable actuating mechanism, the movement being so slight while the radius is so long that the result is substantially the same as if the entire horn and horn support were moved laterally.

The horn $c$ is mounted in a horn support $c^2$ (Fig. 25) and is depressible with relation to the said support against the stress of a spring $c^3$, substantially as shown and described in the Davey and Ladd patent above cited, the horn also being rotatably mounted in the support. In accordance with the present invention, the horn $c$ and horn support $c^2$ are arranged to oscillate laterally, the said support $c^2$ being shown as provided at its lower end with an annular tongue or projection $c^4$ which enters a corresponding groove or bearing $c^5$ in the lower portion of a supporting bracket $c^6$, thus affording an oscillating or pivotal bearing for the said support $c^2$ and the horn $c$ therein. The movement of the horn support in the said pivotal bearing is shown as provided for by means of a cam $c^7$ upon a vertical shaft $c^8$ which extends downward through the shank B of the machine and is driven in any suitable way, as by a bevel gear $c^9$ upon the main shaft A, Figs. 9 and 10. As herein shown, the said cam $c^7$ causes the reciprocation of a member $c^{10}$ (Fig. 26) which is guided in a portion of the shank or lower frame B of the machine, and which carries oppositely disposed wedges $c^{12}$ which act upon inclined surfaces $c^{13}$ connected with the horn support $c^2$, so that as the said wedges $c^{12}$ are moved back and forth, a lateral movement of the upper end of the horn support $c^2$ and horn $c$ with relation to the bracket $c^6$ is produced. The member $c^{10}$ is shown as in the form of a yoke, each member of the said yoke carrying a slide $c^{14}$ which has a bearing on a shoulder $c^{15}$ formed in the upper part of the supporting bracket $c^6$. The wedges $c^{12}$ are shown as provided with tongues $c^{120}$ (Fig. 26) adapted to fit corresponding grooves in the slides $c^{14}$, so that the said wedges can be removed and replaced by others of different inclination if it is necessary or desirable to change the extent of lateral movement of the horn support $c^2$, as would be the case if the feed were changed to vary the distance between adjacent pegs. The said tongues $c^{120}$ cause the wedges $c^{12}$ to participate in the reciprocatory movement of the slides $c^{14}$, without otherwise fastening said parts together, and the backs of the wedges and faces of the slides are curved where they engage as shown in Fig. 25, to prevent the parts from binding because of the curved path of movement of the horn support and the straight path of movement of the slides.

In order to provide for the accurate adjustment of the tip of the horn with relation to the working devices of the head so that the axis of the horn may be brought into exact coincidence with the plane of the awl and driver, the bracket $c^6$ is herein shown as provided with trunnion supports $c^{16}$ in the frame, on which supports the said bracket and the horn carried thereby may be rocked toward and from the front of the machine. In order to obtain a delicate adjustment and firmly to secure the bracket and horn after the adjustment has been effected, the wedges $c^{160}$ are employed, as best shown in Fig. 26, and interposed between the frame of the machine and inclined surfaces formed on the bracket $c^6$. As herein shown, there are two wedges formed in a single member in which an adjusting screw $c^{161}$ is threaded, the said adjusting screw being mounted in a portion of the frame and held longitudinally stationary therein by means of shoulders $c^{162}$. By turning the said adjusting screw, therefore, the wedges may be moved in either direction to vary the position of the top of the horn in relation to the head of the machine, and after the desired adjustment is attained the horn is locked to the frame in the position determined by the wedges, by means of bolts or cap screws $c^{163}$. In order that such adjustment may be made without varying the feed movement provided for by means of the wedges $c^{12}$, the slides $c^{14}$ which carry the said wedges are shown as screw threaded upon the yoke members of the part $c^{10}$, so that by turning the said yoke members the position of the slides $c^{14}$ may be varied with relation to the cam $c^7$ to correspond to the variation in position of the bracket $c^6$.

In order that the lateral movement of the horn $c$ relative to the material during the time that the material is held stationary may be readily accomplished, the machine is provided with a horn depressing device which is adapted to lower the horn automatically during the lateral movement thereof in one direction. The said horn depressing device is best illustrated in Figs. 10, 11 and 12, and is shown as an actuating member $f$ which is adapted to coöperate with the horn, the said member $f$ being shown as operated by cams $f^5$ and $f^7$ on the vertical shaft $c^8$. The depressing device is arranged to have a double movement, one element of which causes the member $f$ to engage the horn, while the other element produces the downward movement of the horn. As herein shown, the member $f$ consists of a rocker pivotally supported on studs $f^2$ at opposite sides of the inclosing shell B for the base portion of the machine, and the lower portion of the rocker is provided with a sliding member $f^3$ having a cam roll $f^4$ adapted to be acted upon by a cam $f^5$ on the shaft $c^8$, the member $f^3$ being provided with a spring $f^{30}$ which holds the cam roll $f^4$ against the said cam, the action of the said cam being such as to produce a longitudinal movement of the member $f^3$ toward a rack or series of teeth $c^{17}$, connected with the horn depressing yoke. The cam $f^5$ acting at the proper time to move the member $f^3$ into engagement with the teeth $c^{17}$, it will be seen that if the rocker $f$ is moved on its pivot in the right direction it will lower the horn, as desired. To accomplish this the rocker $f$ is provided with a cam roll $f^6$ adapted to be acted upon by a cam $f^7$ which causes the rocker $f$ to turn on its pivotal supports $f^2$ against the stress of a spring or suitable restoring device $f^8$. Since the horn may vary in its vertical position owing to variations in thickness of the material which is being operated upon, while it is desirable that there should be substantially no lost motion in the operation of the depressing device, the member $f^3$ is provided with a series of teeth or projections $f^9$ parallel to each other, and each formed independent of the others and each yieldingly pressed forward toward the rack $c^{17}$ as by a spring $f^{10}$, such forward movement being limited by a shoulder formed in the member $f^8$. These teeth, which are intended to engage the teeth $c^{17}$, when the slide $f^3$ is pushed forward by the cam $f^5$ are arranged at slightly different heights so that at least one of the said teeth will be substantially in line with one of the teeth $c^{17}$, regardless of the vertical position of the horn, such other teeth as may not be in alinement therewith being pressed out of the way against the stress of the springs $f^{10}$. During the return movement of the horn $c$ while it is out of engagement with the material as above described, the material is held by means of a gripping device, consisting of a gripper member $g$, which is arranged to engage the material below and press the same upward into contact with the nose-plate $d$, thereby firmly holding the material (see Figs. 19, 20, 21, 22, 23, and 24).

The gripper $g$ is arranged to be operated by means of a cam $g^2$ on the main shaft A, the motion being imparted to the gripper which is supported at the end of a lever $g^3$ through the agency of an intermediate lever $g^4$, having a cam roll $g^5$ which directly coöperates with the cam $g^2$. The device is, however, so arranged that while the initial movement of the gripper $g$ toward and from the material is produced by the action of the cam $g^2$, the gripper is really actuated when in its operative position by means of a spring or equivalent yielding means, and the same spring may advantageously be utilized to keep the cam roll $g^5$ against the surface of the cam $g^2$ to insure the releasing movement of the gripper $g$ as soon as the cam roll $g^5$ reaches the low portion of the cam surface. As herein shown, the lever $g^4$ has a loose or sliding connection $g^6$ with the lever $g^3$, and a pivotal connection at $g^7$ with a plunger $g^8$ which is acted upon by a spring $g^9$, the said lever $g^4$ having also a bearing surface $g^{40}$ between its points of connection $g^6$ and $g^7$, which bearing surface normally rests upon a stationary projection $g^{41}$ suitably secured to the frame of the machine. The normal position of the parts is shown in Fig. 23, and the spring $g^9$ acting on the lever $g^4$ presses the same into engagement with the projection $g^{41}$, the lever $g^4$ rocking on said projection as a fulcrum, as far as the surface of the cam $g^2$ will permit. Thus the spring $g^9$ in this position holds the cam roll $g^5$ against the cam $g^2$ while that portion of the lever $g^4$ which is connected with the lever $g^3$ tends to lift the end of the said lever $g^3$ and to move the gripper $g$ away from the nose-plate. Thus the gripper members are separated, leaving the material free to move. As the cam $g^2$ rotates, however, it presses the cam roll $g^5$ to the left as indicated in Fig. 24, and the lever $g^4$ rocking on the projection $g^{41}$ as a fulcrum will tend to lower the end of the lever $g^3$, and to raise the plunger $g^8$ against the stress of the spring $g^9$, the principal movement taking place where there is the least resistance. As soon, however, as the gripper $g$ engages the material so that its movement is resisted, the lever $g^4$ will rock on the connection $g^6$ compressing the spring $g^9$, the tendency of which then is to exert its pressure substantially directly upon the end of the lever $g^3$, the movement of the lever $g^4$ having carried the engaging surface $g^{40}$ away from the projection $g^{41}$. The gripper $g$, therefore, is held in engagement with the material mainly by the action of the spring $g^9$ instead of by the direct pressure exerted by the cam $g^2$ upon the lever $g^4$.

It is desirable that the pressure of the gripper should be about the same in all cases, and not be varied to any extent in response to variations in the thickness of the material. To this end the initial position of the gripper, in accordance with the present invention, is arranged to be automatically varied in response to variations in the thickness of the material, this being advantageously accomplished by connecting with the horn suitable means for varying the position of the gripper, since the horn, of course, varies its position in response to variations in the thickness of the material, at every cycle of operations. As herein shown, the lever $g^3$ is pivotally supported upon an eccentric $g^{10}$, mounted on a rock shaft $h$, the said rock shaft having a radial extension $h^2$ suitably connected with a rod $h^3$ which in turn is connected with the horn so as to move vertically therewith. The means for connecting the horn and the rockshaft are best shown in Figs. 1$^a$ and 1$^b$, and Figs. 9, 10 and 11, it being obvious that any vertical movement of the horn will, through the agency of the rod $h^3$, produce an oscillating movement of the rockshaft $h$ and a corresponding movement of the eccentric $g^{10}$, the center of which is the center of oscillation of the lever $g^3$. The oscillation of the shaft $h$ will obviously shift the center of the eccentric $g^{10}$, thus moving the center of oscillation of the lever $g^3$, and the eccentric is so arranged, as shown, that the principal movement of said center of oscillation is transverse to the axis of the lever $g^3$ and raises or lowers the gripper member $g$, thus varying the distance between it and the nose-plate without interfering at all with the operation.

While the variation of the gripper action to correspond to variations in the thickness of the material might be accomplished in various ways without departing from this feature of the invention, the construction above described has the advantage that substantially no variation is required in the movement of the actuating mechanism itself. Furthermore, the spring action is desirable for general reasons, and besides, in conjunction with the release action of the horn, the spring maintains the gripping pressure during the slight downward movement of the horn in releasing when the horn itself is utilized to vary the action of the gripper.

To adjust the initial position of the center of oscillation of the lever $g^3$ in order to adapt the machine for materials differing in average thickness, the rod $h^3$ is shown as adjustably connected to a rod $h^{30}$, (Fig. 1), the latter being directly connected with the horn as by an arm $h^{40}$, (Figs. 11 and 12), the said rods $h^3$ and $h^{30}$ being shown as provided with toothed surfaces $h^{31}$ which are adapted to be clamped together by means of a bolt $h^{32}$ which is provided with a nut $h^{33}$ and which extends through an elongated slot in one of the said members, so that one member may be longitudinally moved relatively to the other before they are clamped.

It is desirable, of course, that there should be no operation of the gripper adjusting mechanism above described, except in response to the variations in position of the horn while the machine is operated. In other words, it is desirable that the entire downward movement of the horn which takes place when the horn is depressed for the insertion of new material should not be transmitted to the gripper mechanism. For this reason, as shown in Figs. 1$^a$ and 1$^b$ the radial arm or member $h^2$ is provided with a slot $h^{20}$ which receives a pin or projection $h^{34}$ from the rod $h^3$, the said slot for a portion of its distance standing in such relation to the rockshaft $h$ that the vertical movement of the rod $h^3$ will turn the said rockshaft. When, however, the said rockshaft has been turned a certain predetermined distance in response to the downward movement of the rod $h^3$ it will carry the pin $h^{34}$ into a portion of the slot $h^{20}$, the walls of which are not curved, so that the slot where the pin is will then be in alinement with the movement of the rod $h^3$, thus permitting the movement of said rod without any corresponding movement of the rockshaft $h$, and at the same time without permitting the parts to become disconnected from each other. The straight portion of the slot, however, comes into alinement with the rod $h^3$ only when the horn is abnormally depressed for the sake of applying the work, the slot $h^{20}$ being so shaped that any movement of the horn when the machine is in operation will be imparted to the shaft $h$.

It is desirable in many cases to drive two or more parallel rows of pegs at different distances from the edge of the sole, and for this purpose the machine may be provided with an adjustable gage, such a gage being shown in part in Figs. 19, 20, 21, and 22. The means for moving the gage do not form any part of the present invention, and are, therefore, not shown and described herein. The gage is shown as a member $i$ adapted to afford an abutment for the edge of the sole to position the same with relation to the nose-plate $d$, the said member $i$ being mounted on a movable arm or slide $i^2$ whereby the position of the gage may be changed with relation to the awl and the driving mechanism. In order that the position of the gripper may correspond to that of the gage the said gripper is shown as movably supported in the lever $g^3$, which may be, as indicated in Figs. 22, 23 and 24, provided with an undercut or dove-tailed groove $g^{12}$ for the said member $g$, and the member itself is arranged to move with the gage $i$ so as to project as far forward toward the side of the shoe upper as is practicable, under all conditions. As herein shown, the gage arm $i^2$ is provided with a projecting member $i^3$ mounted on a rod $i^4$ connected with the gage arm $i^2$ and being longitudinally movable on said rod with relation to the said gage arm toward and from a shoulder $i^5$ against which shoulder it is normally pressed by a spring $i^6$. The said member $i^3$ is connected with the gripper member $g$, being shown as extending through an opening in said gripper member so that any movement of the projection $i^3$ in either direction will be transmitted to said gripper member. When, therefore, the gage $i$ is moved away from the nose-plate for the purpose of driving an inner line of pegs, the gripper member $g$ will be correspondingly moved away, so that the said gripper member will not project far enough toward the upper to prevent the edge of the sole from resting against the gage. In order, however, that the said gripper member may accommodate itself to slight irregularities in the upper, the connection with the gage arm $i^2$ is positive only in the movement of the said gage arm away from the edge of the sole, it being obvious that the gripper member can be pushed farther away against the stress of the spring $i^6$, as shown in Fig. 21. The said gripper member, therefore, may extend over substantially the entire surface of the sole where it extends beyond the upper, regardless of the position of the gage, and while it does not normally come into wearing contact with the upper, is free to yield if the upper projects slightly nearer the edge than ordinary along different parts of the shoe, as shown in Fig. 21. The illustration of this yielding of the gripper in Fig. 21 is somewhat exaggerated in order to render this feature of the invention clear, and it is to be understood that the gage is shown as in the same position in Figs. 20 and 21, and that the gage and the gripper connected therewith as described would be moved together to the left with relation to the nose-plate $d$ if a second line of pegs were to be driven. In this case the gage and gripper member would be in the same position relative to each other as shown, and in the same position relative to the sole, the said sole, however, being held farther to the left with relation to the nose-plate and the horn so as to receive the inner line of pegs. This feature of the invention is equally applicable to a non-adjustable gage, since it is desirable in any event to allow the gripper to project forward as far as possible and at the same time to yield before irregularities in the upper. The specific construction might, however, be substantially the same, but if the gage were non-adjustable, it would obviously be immaterial whether or not the stop and spring for the gripper were connected with the gage itself, provided the stop were so located with relation to the gage as to permit the maximum limit of forward movement of the gripper.

The peg cutting mechanism which is best illustrated in Figs. 13 to 18, is arranged to cut pegs to substantially correspond in length to the thickness of the material, or in other words to vary the length of the pegs in proportion to variations in thickness of the material, the pegs being cut in the operation of the machine from a strip of peg wood $k$ which is fed between successive operations in any suitable way, as by feed rolls $k^2$. In order to sever the pegs the machine is provided with two knives or cutting blades $m$ and $n$, the former, which will be hereinafter referred to as the severing blade, being arranged to cut or sever a peg from the end of the peg wood $k$, while the latter, which will be hereinafter referred to as the measuring blade, is arranged to cut more or less material from the top of the peg wood strip in order to regulate the length of the peg. The measuring blade $n$, for the purpose above described, is secured upon a vertically movable frame $n^2$, which is arranged to move in response to the variations in the thickness of the material, moving upward if the material becomes thicker, and downward if the material becomes thinner, thus at each operation cutting a peg which is equal in length to the thickness of the material. While it is not essential that the severing blade $m$ should move vertically, the said blade $m$ is for convenience mounted on the same frame $n^2$, but is of sufficient length to extend far enough below the peg-wood to completely sever the peg, regardless of the vertical position of the said frame. This frame is laterally stationary with relation to the head of the machine, and the peg wood which is carried by the traveling head $e$ which contains the awl and driving mechanism, is pressed by the said head against the blades $m$ and $n$ each time the head moves over, in the general operation of the machine, as previously described. The measuring blade $n$ is arranged to have a shearing action, and projects beyond the cutting blade $m$, being provided with beveled edges which cut the peg wood vertically as well as horizontally beyond or above the cutting blade $m$. By having the measuring blade project beyond the severing blade, the peg is measured, or cut to length, before it is actually cut away from the strip, thus insuring accuracy which it would be difficult to attain if the peg were severed first. In order to support the peg wood in this shearing operation, the traveling block $o$ against which the peg wood rests, is provided with a projection $o^2$, the upper surface of which is adapted to stand close under the measuring blade $n$, so as to coöperate therewith in shearing the top of the peg. It is obvious, therefore, that when the measuring blade $n$ is moved vertically to measure the peg, it is necessary that the projection $o^2$ should move correspondingly, and for this purpose the member $o$ is so mounted in the traveling carrier as to be capable of vertical movement therein, and is provided with a sliding connection with the frame $n^2$ so as to be vertically moved therewith without interfering with its own horizontal movement produced by the carrier. As herein shown, the said frame $n^2$ is provided with a projection $n^3$ which enters an opening in the member $o$, so that the frame $n^2$ and member $o$ will move up and down together. Since the position of the horn depends upon the thickness of the material, the movement of the horn in response to variations in thickness may conveniently be utilized in positioning the measuring blade $n$, and the same rock-shaft $h$ which has been previously described in conjunction with the gripper may be utilized to vary the position of the measuring blade.

As herein shown, the frame $n^2$ is connected by means of a link $n^4$ having an eccentric strap $n^5$ which coöperates with an eccentric $n^6$ on the shaft $h$, the said eccentric being so positioned upon said shaft that the rotation thereof which results from the downward movement of the horn will produce an upward movement of the link $n^4$, and a corresponding upward movement of the support $n^2$. By properly positioning the parts, therefore, it is obvious that each peg which is cut at the time when the material is in a position to receive it, will be cut to a length equal to the thickness of the material at that point, since upon such thickness depends the position of the horn, and consequently the position of the measuring blade. The peg thus cut and measured must be fed to a position over the opening made in the material by the awl, and in order that the identical peg measured may be fed prior to any further movement of the horn, the machine embodying the invention is provided with an intermediate feeding device instead of depending upon the next forward movement of the peg wood strip, which, in view of the space which must be left between the end of the peg wood strip and the position of the driver, would result in the feed of the previously cut peg, which would lie between the end of the strip and the driver.

The feed mechanism for the pegs is best shown in Figs. 13, 16, 17 and 18, the feeding device consisting of a finger $p$ which is adapted to engage and feed the peg, the said finger being shown as pivotally secured at $p^2$ upon a stationary part of the frame, and being controlled in its movement by the traveling carrier $e$. The finger $p$ is normally held in substantial alinement with the cutting blade $m$, so as to lie behind the severed peg, by means of a spring plunger $p^3$ acting on a shoulder $p^4$, the yielding of the spring plunger permitting the feed movement of the finger $p$, which may be produced by the return movement of the carriage after the peg is cut. Fig. 17 shows the carriage $e$ at the end of its movement to the left, which movement forces the peg wood strip $k$ against the cutting blades above described, and severs the peg, the said carriage in Fig. 18 being shown as moved back, carrying the severed peg with it into a position in front of the feed finger $p$. At this time the pivotal hub of the feed finger is engaged by an adjustable projection $p^6$ secured to the carriage, the said projection being adapted to engage a radial shoulder $p^7$ formed on the said hub, so that as the carriage moves back to its limit it will rock the said hub against the stress of the spring plunger $p^3$, moving the finger $p$ to the position shown in Fig. 13, and carrying the peg into position to be driven.

With the pegs accurately measured it is not necessary to employ a cutting or trimming device, since the pegs may be so driven that they will not project materially beyond the inner surface of the sole. It is desirable, however, that the pegs should be slightly longer than the thickness of the material, (the additional length, of course, being the same with every peg, on account of the measuring device) and the machine embodying the invention is provided with a clenching device or hammer adapted to coöperate with the end of the peg after it has been driven, the said hammer having a movement toward and from the end of the horn so as not to interfere with the operation of the awl when penetrating the material. This construction is best shown in Figs. 28, 29 and 30, the hammer $q$ being shown as supported upon the end of the rod $r$, which is longitudinally movable in the upper end of the horn, the said rod $r$ being shown as pivoted at $r^2$ to a rod $r^3$, which in turn is given a reciprocating movement through the agency of a rocker $r^4$ connected with a vertically movable rod $r^5$, this construction being merely for the purpose of adapting the device for use with a curved horn. The rod $r^5$ is arranged to be reciprocated by means of cam rockers $r^6$ pivotally connected with the horn near the lower end thereof, (Figs. 10, 11, 25 and 27) and having cam surfaces adapted to engage projections on the rod $r^5$ and give the reciprocating movement desired as the said rockers are moved on their pivotal support. This movement is shown as afforded through the agency of a link $r^7$ having a universal joint $r^8$ by which it is connected to a slide $r^9$ which coöperates with a cam or eccentric $r^{10}$ on the vertical shaft $c^8$, which as previously described extends downward through the base of the machine.

The hammer $q$ is shown as pivotally connected to the rod $r$ and provided with a spring $q^2$ which tends to maintain the hammer in engagement with the interior of the horn, so that the said hammer will slide into the opening in the horn in the upward movement of the rod $r$, as shown in Figs. 28 and 29. The movement may be so timed that the hammer $q$ will not wholly reach the top of the horn at the time the peg is driven, but will be driven sharply upward to clench the peg just after the driver descends, but before it has been again lifted, such construction being indicated in Figs. 28 and 29.

While the machine herein shown and described constitutes a complete and practicable embodiment of the invention, it is not intended to limit the invention to the specific construction and arrangement chosen as an illustration, since modifications may be made therein without departing from the invention.

Claims.

1. In a pegging machine, the combination with an awl and driver; of separate means for operating said awl and driver, respectively; a laterally movable carrier for said awl and driver; means for varying the extent of lateral movement of said carrier; a laterally movable horn; and means for varying the extent of movement of said horn to correspond to that of said carrier.

2. In a pegging machine, the combination with a laterally movable carrier for the awl and driver having a continuous movement in each direction; of a lever connected with said carrier; a second lever and means for giving the second lever a definite movement at each cycle of operations; and an adjusting connecting device between said levers whereby the point of connection between the levers can be shifted with relation to the fulcrums of both levers, a laterally movable horn; and means for varying the extent of the lateral movement thereof, as set forth.

3. In a pegging machine, the combination with an awl; of a hammer; separate means for operating said awl and hammer, respectively, to cause the awl to penetrate the material and the hammer to drive the peg; a laterally movable carrier for the awl and hammer; a horn or work support; and means for moving said horn laterally toward the awl during the penetrating of the material by the awl.

4. The combination with the laterally movable awl; of a laterally movable hammer; means independent of each other for operating said awl and hammer; a horn; and means whereby said horn is moved laterally with the awl, and the material penetrated thereby is caused to remain stationary during the withdrawal of the awl and the operation of the hammer, and the horn caused to be moved in the opposite direction prior to the next complete operation of the awl.

5. In a pegging machine, the combination with an awl adapted to penetrate the material; of a horn or work support provided with an opening to receive the awl; means for laterally moving said horn to a position in which the opening therein is in alinement with the awl, and then in the opposite direction away from said position; and means for laterally moving the awl with the horn in the lateral movement last described.

6. In a pegging machine, the combination with a laterally movable awl; of a horn or work support provided with an opening to receive the awl; means operating during the penetrating movement of the awl for moving said horn laterally to bring said opening into alinement with the awl, said horn and awl then moving together in the opposite direction; a driver to drive a peg into the hole made by the awl; and a gripper to hold the material during the lateral movement of the horn after the peg has been driven.

7. In a pegging machine, an awl and driver; means for moving said awl and driver laterally in two directions; means for moving said awl vertically; means for moving said driver vertically; a horn or work support provided with an opening to receive the awl after it has penetrated the material; and means for producing a lateral movement of the said horn in two directions, the horn moving toward the awl during the downward movement thereof, and with the awl after such downward movement.

8. In a pegging machine, the combination with a laterally movable awl; of means for adjusting the extent of lateral movement thereof; a horn having a corresponding lateral movement; and means for correspondingly adjusting the lateral movement of the horn, as set forth.

9. In a pegging machine, the combination with a horn or work support having a reciprocating lateral movement to contribute in the feed of the material; of means for holding the material during the return movement of the horn after the feed has taken place, the holding means consisting of two members to engage the material between them; and means for automatically varying the distance between the said members to correspond to the thickness of the material, as set forth.

10. In a pegging machine, the combination with a horn having a lateral reciprocating movement to contribute in the feed of the material; of a gripper adapted to hold the material during the return movement of the horn; yielding means for finally controlling the gripping operation thereof; and a device for causing an initial movement of said gripper prior to the action of said yielding means.

11. In a pegging machine, a gripper for holding the material between feed movements thereof; a lever for operating said gripper; means for moving said lever a predetermined distance at each cycle of operations; a spring or equivalent device acting on both said lever and said gripper, the said spring constituting the means for effecting the gripping operation; and means for varying the initial position of said gripper to correspond to variations in the thickness of the material; as set forth.

12. In a pegging machine, the combination with a depressible horn; of a nose-plate against which the material is held by the said horn; a gripper adapted to press the said material against the said nose-plate independently of the horn; means for operating the said gripper to engage and release the material; and means connected with the depressible horn for varying the initial position of the gripper, as set forth.

13. In a pegging machine, the combination with a laterally movable awl to feed the material; of a laterally movable horn to coöperate with said awl, the said horn being spring pressed against the material; and a releasing device comprising means for depressing the said horn to release the same from the material in the return movement thereof after the material has been fed, as set forth.

14. In a pegging machine, the combination with a laterally movable horn spring pressed against the material; of a releasing device adapted to depress the horn with relation to the material during the lateral movement of the horn, the said releasing device comprising a member and means for moving it into connection with the horn, and means for moving it and the horn after they are thus connected to depress the horn against the stress of its spring.

15. The combination with the horn and spring pressed horn carrier; of a series of teeth or engaging portions on said carrier; a depressing member having a series of independent teeth in different planes, each yieldingly supported; means for moving said member toward the horn carrier so that one or more of said teeth will engage the teeth on said horn carrier; and means for producing another movement of said member to depress the horn carrier thus engaged therewith, as set forth.

16. In a pegging machine, the combination with a gage for the material; of a gripper member projecting beyond the said gage to come in contact with the surface of the material; and means for yieldingly holding the said gripper member in its projecting position relative to the gage, substantially as and for the purpose described.

17. In a pegging machine for boots and shoes, the combination with a gage for the edge of the sole; of a gripper member projecting beyond the said gage to coöperate with the sole where it projects beyond the upper; and means for yieldingly holding the said gripper in its projecting position whereby the said gripper can move with relation to the gage in response to the irregularities in the upper without preventing the sole from being held in contact with the gage, as set forth.

18. In a pegging machine, an adjustable gage for the material; a gripper member projecting beyond the said gage toward the material; and means for yieldingly connecting said gripper member with said gage, substantially as described.

19. In a pegging machine, the combination with a movable gage; of a gripper arm provided with operating means; a gripper member movable with relation to said arm; and a connection between said gripper member and said gage, whereby said member is movable with the gage independently of the movement of the arm, and vice versa.

20. In a pegging machine, the combination with the horn; of a horn support pivotally connected with a portion of the machine; a laterally reciprocating awl; and means for oscillating said horn support on its pivot to produce a reciprocating travel of the horn, said means being arranged to cause the horn and awl to move in one direction at the same time and in the opposite direction at different times.

21. In a pegging machine, the combination with the horn; of a horn support having a pivotal bearing and opposite inclined side faces; members with inclined faces adapted to engage the corresponding inclined faces of said horn support; and means for reciprocating the said members to oscillate the horn support and produce a lateral movement of the horn, as set forth.

22. In a pegging machine the combination with the horn support having a pivotal bearing; of a member movable transversely to the horn; wedges removably secured to said member to engage the horn support, and correspondingly curved engaging surfaces for said wedges and said member respectively to prevent the wedge from binding in the oscillating movement of the horn support.

23. The combination with a horn; of a supporting bracket therefor; means for laterally oscillating said horn in said bracket; a pivotal connection between said bracket and the frame of the machine whereby the horn can be adjusted with relation to the head of the machine; and means for fastening said bracket in the adjusted position.

24. The combination with the horn; of a supporting bracket therefor; a pivotal connection between said supporting bracket and the frame of the machine whereby the horn can be adjusted with relation to the head of the machine; and adjusting wedges interposed between said bracket and the frame, as set forth.

25. The combination with the horn; of the horn-support; a bracket for said support pivotally connected with the frame; a pivotal connection between said horn-support and said bracket; and means for oscillating the horn on said pivotal connection.

26. In a pegging machine, the combination with a laterally movable horn, and means for producing the lateral movement thereof; of a releasing device to depress the horn with relation to the material during its movement relative thereto; means for holding the material during such movement; means for engaging said releasing device with the horn; means operating subsequently upon said releasing device for depressing the horn; and a counter shaft provided with operating devices for the several means aforesaid.

27. In a pegging machine, the combination with means for feeding a peg-wood strip; of a severing blade to cut a peg from the end of a strip; a measuring blade transverse to the severing blade and movable in line therewith, the said measuring blade projecting beyond the severing blade to engage the peg-wood before the peg is severed and a feeding device for the cut peg, as set forth.

28. In a pegging machine, the combination with means for feeding a peg wood strip; of means for cutting the peg to correspond in length to the thickness of the material; and a feeding device to present the peg after it has been cut to the opening in the material prior to any further movement of the material, as set forth.

29. In a pegging machine, the combination with means for feeding a peg wood strip; of a severing blade to cut a peg therefrom; a blade transverse to said severing blade and movable with relation to said peg-wood strip to trim the peg to the desired length; a stationary nose-plate; a depressible horn, spring-pressed against the material which is between said horn and the said nose-plate; means for producing a movement of the measuring blade to correspond to the position of the horn determined by the thickness of the material, and a feeding device operating on the peg after it has been cut, as set forth.

30. In a pegging machine, the combination with a carrier for the awl and driver; of means for feeding a peg-wood strip contained in said carrier toward the driver; a stationary severing blade against which the peg-wood strip is forced by the carrier; a measuring blade arranged to trim the peg to the length required determined by the thickness of the material where the peg is to be driven; and a peg feeding device operating in the return movement of the carrier to present the peg to the material prior to any further movement of said material, as set forth.

31. In a pegging machine, the combination with a depressible horn; of a movable actuating device connected with said horn so as to be moved in response to variations in the position thereof; the connection between the said device and said horn consisting of an arm connected with said device and provided with a slot or channel to receive a projection connected with the horn, said slot or channel being shaped so as to come into alinement with the direction of movement of said projection after the horn has been depressed to a certain extent, whereby further depression of the horn will not produce any further movement of said device, as set forth.

32. In a pegging machine the combination with means for feeding a peg wood strip; of a movable measuring blade for trimming a peg to length; a depressible horn or work support; a rock-shaft connected with said horn; means for connecting said rock-shaft with said blade, whereby the longitudinal movement of said horn is imparted to said blade; and a feeding device operating on the peg after it has been cut.

33. In a pegging machine, the combination with a horn or work support having a reciprocating lateral movement to contribute in the feed of the material; of means for holding the material during the return movement of the horn after the feed has taken place, the holding means consisting of two members to engage the material between them.

In testimony whereof, I have signed my name to this specification in the presence of two subscribing witnesses.

JOHN F. DAVEY.

Witnesses:
HENRY J. LIVERMORE,
JAS. J. MALONEY.